(12) United States Patent
Zhou et al.

(10) Patent No.: US 11,733,596 B2
(45) Date of Patent: Aug. 22, 2023

(54) QUICK-ASSEMBLY SEAT, QUICK-RELEASE ASSEMBLY AND PHOTOGRAPHING APPARATUS

(71) Applicant: Shenzhen youzhisheng Technology Co., Ltd., Shenzhen (CN)

(72) Inventors: Shengwu Zhou, Shenzhen (CN); Hanjun Luo, Shenzhen (CN); Weixin Jiang, Shenzhen (CN); Chunguang Zheng, Shenzhen (CN); Hailin Zhang, Shenzhen (CN); Xianmin Chen, Shenzhen (CN)

(73) Assignee: SHENZHEN YOUZHISHENG TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/571,551

(22) Filed: Jan. 10, 2022

(65) Prior Publication Data
US 2022/0221775 A1    Jul. 14, 2022

(30) Foreign Application Priority Data

Jan. 14, 2021  (CN) .......................... 202120095718.9
Aug. 24, 2021  (CN) .......................... 202110976922.6

(51) Int. Cl.
| | | |
|---|---|---|
| G03B 17/56 | (2021.01) | |
| F16M 11/04 | (2006.01) | |
| F16M 13/02 | (2006.01) | |
| H04M 1/02 | (2006.01) | |

(52) U.S. Cl.
CPC ......... *G03B 17/561* (2013.01); *F16M 11/041* (2013.01); *G03B 17/563* (2013.01); *F16M 13/022* (2013.01); *H04M 1/0264* (2013.01)

(58) Field of Classification Search
CPC .......... H04M 1/04; H04M 1/38; G03B 17/56; G03B 17/561; F16M 11/041
See application file for complete search history.

(56) References Cited

U.S. PATENT DOCUMENTS

| | | | |
|---|---|---|---|
| 9,651,069 B2* | 5/2017 | Aspinall | ................... F16B 2/04 |
| 10,598,199 B1* | 3/2020 | Fan | ....................... F16M 13/022 |
| 2021/0046885 A1* | 2/2021 | Jankura | .................. F16M 13/02 |

* cited by examiner

*Primary Examiner* — Leon W Rhodes, Jr.
(74) *Attorney, Agent, or Firm* — Bayramoglu Law Offices LLC

(57) ABSTRACT

A quick-assembly seat includes a seat body, a clamping assembly and a driving assembly. The clamping assembly includes a clamping member and a touch member which are slidably connected to the seat body. The driving assembly includes a first driving member and a third driving member, where one end of the first driving member and one end of a third driving member are connected to the seat body, and the other end of the first driving member and the other end of the third driving member are respectively connected to the clamping member and the touch member. The clamping member is configured to move along a first direction toward an inside of the seat body, so that the first driving member accumulates a driving force, and the third driving member releases a driving force to drive the touch member to be clamped with the clamping member.

17 Claims, 9 Drawing Sheets

QUICK-ASSEMBLY SEAT, QUICK-RELEASE ASSEMBLY AND PHOTOGRAPHING APPARATUS

CROSS REFERENCE TO THE RELATED APPLICATIONS

This application is based upon and claims priority to Chinese Patent Applications No. 202120095718.9, filed on Jan. 14, 2021, and No. 202110976922.6, filed on Aug. 24, 2021, the entire contents of which are incorporated herein by reference.

TECHNICAL FIELD

The present invention relates to the technical field of photographic accessories, and more particularly, to a quick-assembly seat, a quick-release assembly and a photographing apparatus.

BACKGROUND

With the improvement of people's living standards, more and more people like to record their daily life through photography. Photography can be done with photographing devices such as mobile phones and cameras. In order to facilitate photographing and achieve better photographing effect, the photographing device is usually fixed on a bracket such that the position of the photographing device can be fixed conveniently. In order to conveniently assemble and disassemble the photographing device on the bracket, a transition piece is typically attached to the photographing device, and then the transition piece is threadedly connected to the bracket, so that the photographing device is mounted on the bracket. However, it is time-consuming and laborious to assemble and disassemble the photographing device on the bracket through threaded connection, which is inconvenient in use.

SUMMARY

The present invention provides a quick-assembly seat, a quick-release assembly and a photographing apparatus. The present invention solves the problem of time-consuming and laborious disassembly and assembly and inconvenient use of a photographing device mounted on a bracket by means of threaded connection.

A first aspect of the present invention provides a quick-assembly seat. The quick-assembly seat includes a seat body, a clamping assembly and a driving assembly, where the clamping assembly includes a clamping member and a touch member; the clamping member is slidably connected to the seat body along a first direction, and the touch member is slidably connected to the seat body along a second direction; the first direction and the second direction are perpendicular to each other; the driving assembly includes a first driving member provided along the first direction and a third driving member provided along the second direction; the first driving member is provided between the seat body and the clamping member, and the third driving member is provided between the seat body and the touch member; the clamping member is configured to move along the first direction from an outside of the seat body to an inside of the seat body to allow the third driving member to release a driving force so as to drive the touch member to be clamped with the clamping member, and to allow the first driving member to accumulate a driving force; the touch member is configured to move along the second direction to allow the third driving member to accumulate the driving force; and when the clamping member is separated from the touch member, the first driving member releases the driving force to drive the clamping member to move along the first direction from the inside of the seat body to the outside of the seat body so as to clamp the quick-release part.

To connect the quick-release part to the quick-assembly seat, the quick-release part is moved toward the base. The quick-release part touches the touch member and drives the touch member to move along the second direction until the touch member is separated from the clamping member. The first driving member releases a driving force to drive the clamping member to be clamped with the quick-release part, while the third driving part accumulates a driving force. When the quick-release part needs to be disassembled, the clamping member is pressed along the first direction from the outside of the seat body to the inside of the seat body, until the third driving member releases the driving force to drive the touch member to be clamped with the clamping member. Then the clamping member is separated from the quick-release part, and the quick-release part can be removed from the base. It is quick and convenient to disassemble and assemble the quick-assembly seat and the quick-release part, saving time and effort.

A second aspect of the present invention further provides a quick-release assembly. The includes quick-release assembly a quick-release part and the above quick-assembly seat, where a side of the quick-release part facing the quick-assembly seat is provided with a clamping slot, and a first clamping member and a second clamping member are respectively clamped into the clamping slot.

A third aspect of the present invention further provides a photographing apparatus. The photographing apparatus includes a photographing device and the above quick-release assembly; and the photographing device is provided on a side of the quick-release part away from the quick-assembly seat.

Figure 1:
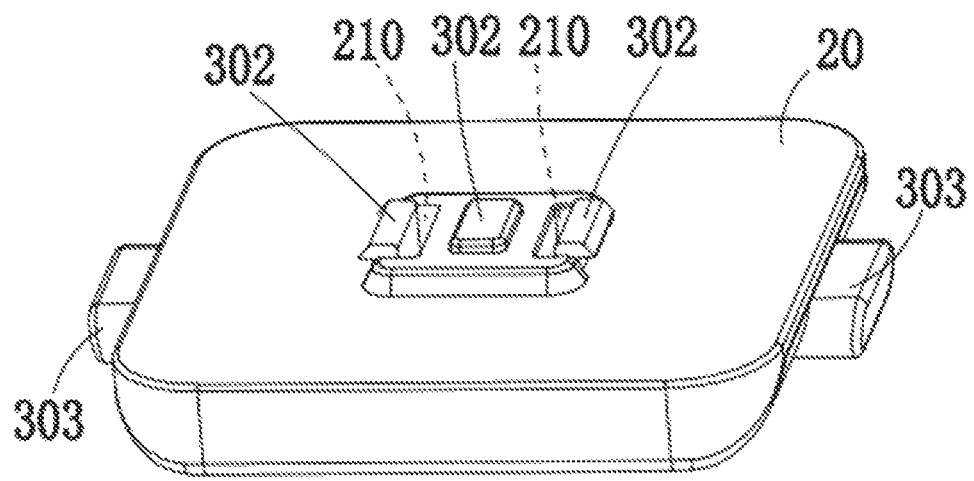
FIG. 1 is a structural view of a quick-assembly seat from an angle when a first connection structure is not shown according to the present invention.
Figure 2:
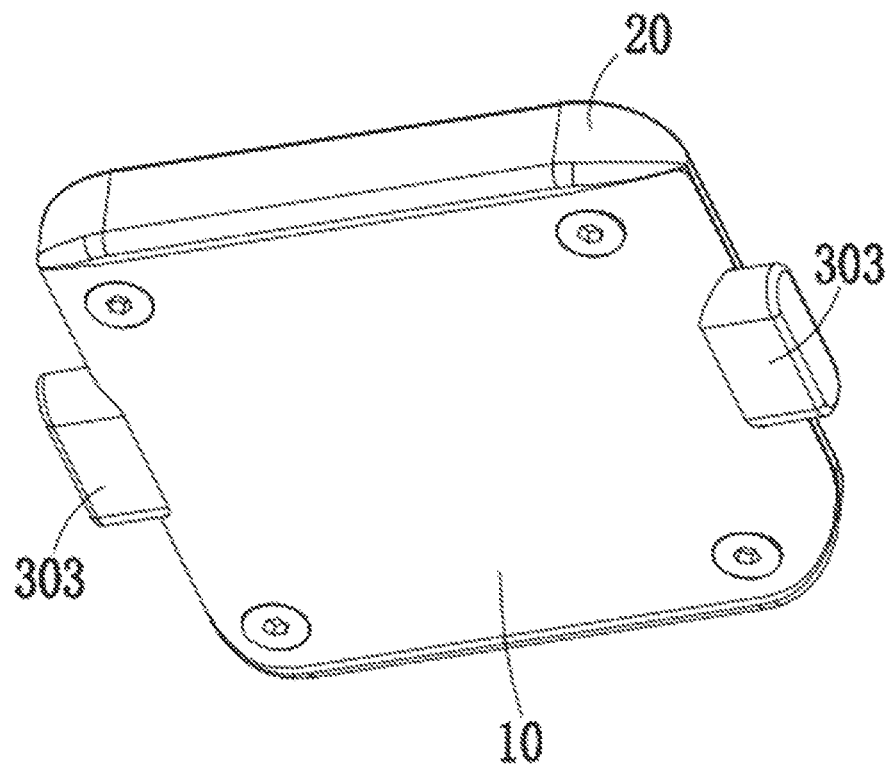
FIG. 2 is a structural view of a quick-assembly seat from another angle when a first connection structure is not shown according to the present invention.

REFERENCE NUMERALS 1. seat body; 10. base; 100. first sliding groove; 110. limit seat; 111. mounting groove; 120. fixing groove; 130. through hole; and 11. first magnetic member;
20. top shell; 200. first clamping hole; 210. second clamping hole; 220. touch hole; 230. positioning groove; 240. stud; and 241. threaded hole;
30. clamping assembly; 300. first clamping member; 301. clamping body; 3011. first surface; 3012. second surface; 3013. clamping groove; 3014. avoidance notch; 3015. first end; 3016. second end; 302. hook; 3021. hook body; 3022. clamping flange; 3023. clamping portion; 303. press seat; 3031. accommodating groove; 310. second clamping member; 320. touch member; 3201. touch body; and 3202. clamping piece;
40. elastic assembly; 400. first elastic member; 410. second elastic member; 420. third elastic member; and 430. magnet;
2. quick-release part; 21. quick-release body; 22. second magnetic member; 23. mounting cavity; 24. clamping slot; 25. mobile phone case; and 251. limiting groove;
3. rotating assembly; 31. first gripping member; 32. second gripping member; 33. rotating seat; 34. supporting member; 35. first tightening screw; 36. second tightening screw; 37. connecting screw; and 38. limit slot; and
4. mobile phone; 5. joystick; and 6. quick-assembly seat.

DETAILED DESCRIPTION OF THE EMBODIMENTS

To make the above objectives, features and advantages of the present invention more comprehensible, the specific implementations of the present invention are clearly and completely described below with reference to the drawings. Obviously, the specific details described below are only part of the embodiments of the present invention, and the present invention may also be implemented in many other embodiments different from those herein. All other embodiments obtained by those of ordinary skill in the art based on the embodiments of the present invention without creative efforts should fall within the protection scope of the present invention.

It should be noted that when a component is fixed with the other component, the component may be fixed with the other component directly or via an intermediate component. When a component is connected with the other component, the component may be connected with the other component directly or via an intermediate component. The terms "vertical", "horizontal", "left", and "right" and similar expressions used herein are just for illustrative purposes, and do not mean sole implementations.

Unless otherwise defined, all technical and scientific terms used herein have the same meaning as commonly understood by those skilled in the technical field of the present invention. The terms mentioned herein are merely for the purpose of describing specific embodiments, rather than to limit the present invention.

Referring to FIGS. 9 to 13, the present invention provides a quick-assembly seat 6. The quick-assembly seat 6 is configured to be clamped with or separated from a quick-release part 2. One of the quick-assembly seat 6 and the quick-release part 2 is connected to a photographing device, such as a mobile phone 4 or a camera, and the other is connected to a mounting location, such as a top of a tripod or a joystick 5 of a bicycle. In the further description below, the quick-assembly seat 6 is connected to a joystick 5 of a bicycle, and the quick-release part 2 is connected to a mobile phone 4. Through the engagement or separation of the quick-assembly seat 6 and the quick-release part 2, the mobile phone 4 is quickly assembled with and detached from the joystick 5 of the bicycle, which saves time and effort, and is convenient. When the mobile phone 4 is mounted on the bicycle, a rider can activate a navigation application in the mobile phone 4, which is convenient for riding and offers a desirable user experience.

As shown in FIGS. 1, 3, 7 and 9, in an embodiment, the quick-assembly seat 6 includes a seat body 1, a clamping assembly 30 and a driving assembly. The seat body 1 includes a base 10 and a top shell 20. The base 10 and the top shell 20 may be fixedly connected by welding or integral molding, and may also be detachably connected by clamping or screwing. In this embodiment, the base 10 and the top shell 20 are detachably connected by screws. Specifically, four corners of the base 10 are respectively provided with screw holes, and four corners of the top shell 20 are respectively provided with studs 240. The studs 240 are respectively provided with threaded holes 241, and four screws are respectively inserted into the four threaded holes to be threadedly connected to the studs 240, so as to connect the base 10 and the top shell 20.

Figure 3:
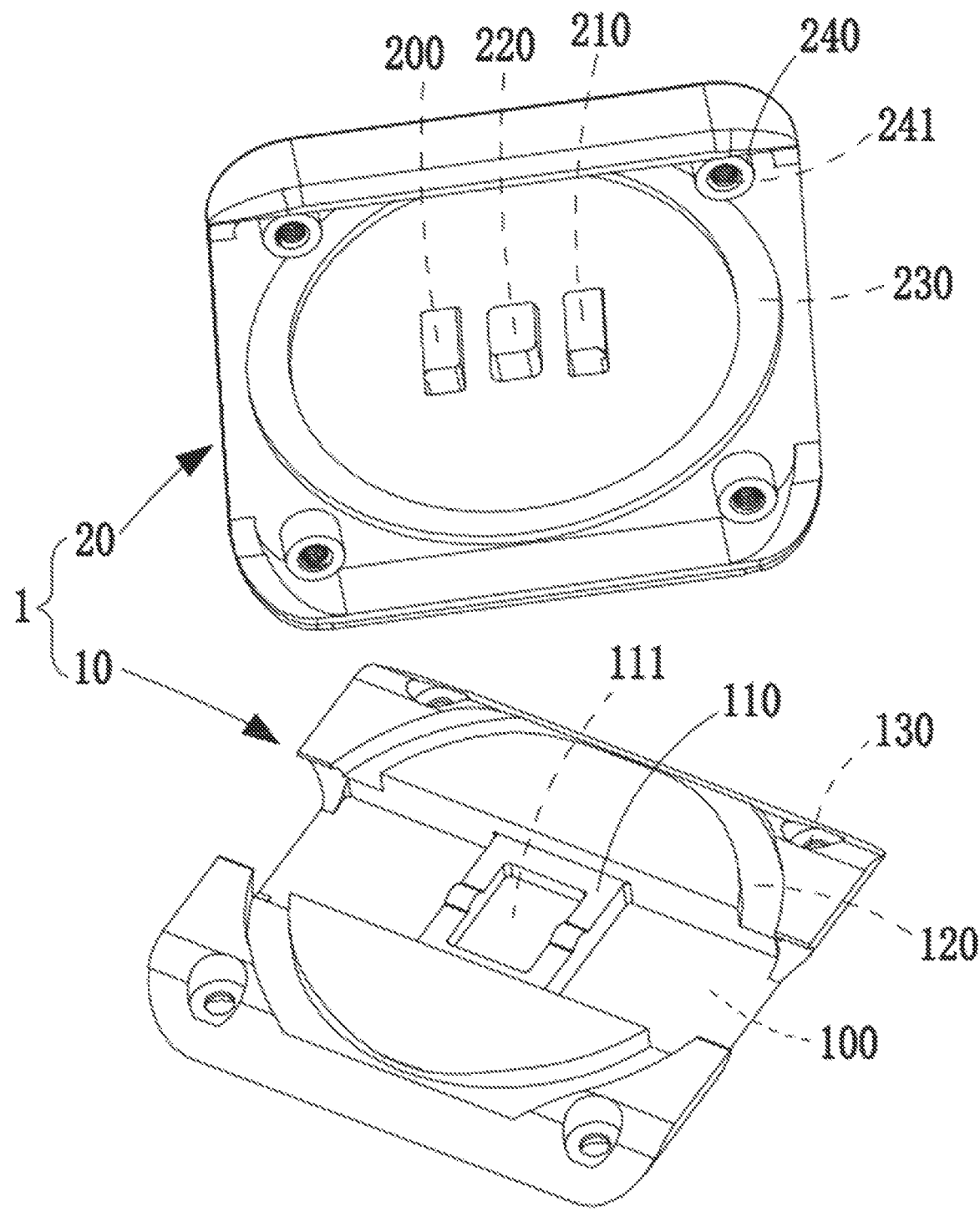
FIG. 3 is an exploded view of a seat body according to the present invention.
Figure 4:
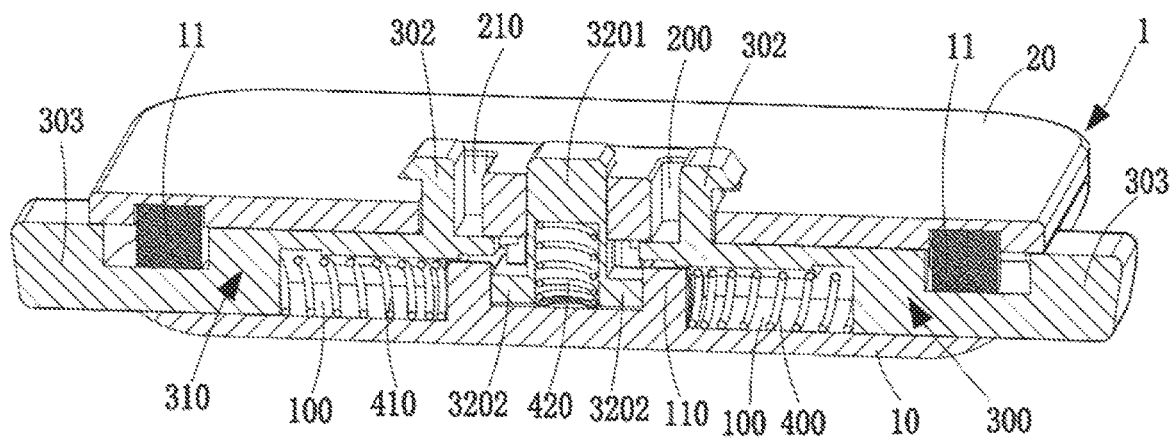
FIG. 4 is a full sectional view of the quick-assembly seat when the first connection structure is not shown according to an embodiment of the present invention.

As shown in FIGS. 3 and 4, the base 10 is provided with a first sliding groove 100 along a first direction, and the top shell 20 is provided with a touch hole 220, a first clamping hole 200 and a second clamping hole 210 along a second direction. The touch hole 220 is provided between the first clamping hole 200 and the second clamping hole 210. A limit seat 110 is further provided at a middle position of the first sliding groove 100. The limit seat 110 is provided with a mounting groove 111 facing the top shell 20 along the second direction. A surface of the base 10 facing the top shell 20 is further provided with a fixing groove 120, and the fixing groove 120 is provided along a circumference of the base 10. The top shell 20 is provided with a positioning groove 230 facing the base 10. When the base 10 and the top shell 20 are connected, the fixing groove 120 and the positioning groove 230 clamp and fix a first magnetic member 11 to accommodate the first magnetic member 11 inside the seat body 1. The first magnetic member 11 is ring-shaped, and the first magnetic member 11 is configured to be magnetically connected to the quick-release part 2 in all directions, so as to make the quick-assembly seat and the quick-release part 2 connected smoothly, thereby enhancing the user experience. In addition, since the first magnetic member 11 is provided inside the seat body 1, it will not affect the aesthetics of the quick-assembly seat. The first direction is an extension direction of the first sliding groove 100, and the second direction is perpendicular to the first direction and parallel to a thickness direction of the base 10.

Figure 7:
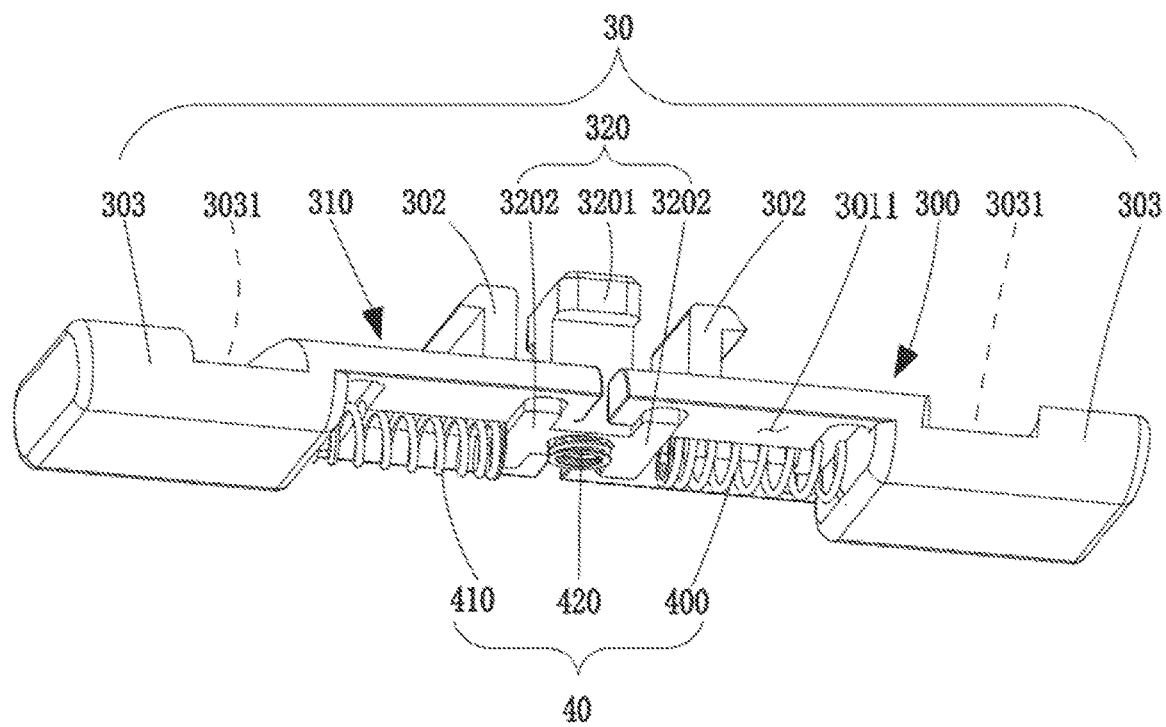
FIG. 7 is a structural view of a clamping assembly and an elastic assembly when the quick-assembly seat and a quick-release part are unclamped according to the present invention.

As shown in FIGS. 3, 4 and 7, the clamping assembly 30 may include one clamping member or a plurality of clamping members. In an embodiment, the clamping assembly 30 includes two clamping members, namely a first clamping member 300 and a second clamping member 310. The clamping assembly 30 further includes a touch member 320. The first clamping member 300 and the second clamping member 310 have an identical structure, and are arranged in the first sliding groove 100 of the base 10. The first clamping member 300 and the second clamping member 310 are located on opposite sides of the limit seat 110 and are slidable along the first direction to be relatively close or far away.

As shown in FIGS. 3, 4 and 7, the first clamping member 300 is further described below, and the structure of the second clamping member 310 is automatically consistent with the first clamping member 300. The first clamping member 300 is configured to be clamped with the touch member 320, that is, one of the first clamping member 300 and the touch member 320 is provided with a clamping groove 3013, and the other includes a clamping piece 3202. In an embodiment, the first clamping member 300 is provided with a clamping groove 3013, and the touch member 320 includes a clamping piece 3202. The clamping piece 3202 and the clamping groove 3013 are clamped or separated to make the first clamping member 300 and the touch member 320 clamped or separated. Further, the first clamping member 300 includes a clamping body 301, a press seat 303 and a hook 302. The hook 302 of the first clamping member 300 and the hook 302 of the second clamping member 310 respectively protrude out of the seat body 1 from the first clamping hole 200 and the second clamping hole 210 of the top shell 20. The first clamping hole 200 and the second clamping hole 210 are configured to limit the two hooks 302, restricting the hooks 302 to only move within lengths of the corresponding clamping holes. In addition, an accommodating groove 3031 is provided between the press seat 303 and the clamping body 301. The accommodating groove 3031 is arc-shaped, and the accommodating groove 3031 is located on a circumferential path of the fixing groove 120 to facilitate the fixing groove 120 to receive the first magnetic member 11.

As shown in FIGS. 3, 4, 6 and 11, the clamping body 301 includes a first surface 3011 and a second surface 3012 opposite to each other along the thickness direction, and includes a first end 3015 and a second end 3016 opposite to each other along a length direction. The first end 3015 is close to the touch member 320, and the second end 3016 is close to the press seat 303. One end of the press seat 303 is connected to the second surface 3012, and the other end of the press seat 303 protrudes out of the seat body 1 from the base 10 to facilitate a user to manipulate the press seat 303. When the clamping body 301 moves along the first sliding groove 100, the clamping body 301 drives the hook 302 to move in the first direction, so as to make the quick-assembly seat clamped with or separated from the quick-release part 2. Further, the hook 302 includes a hook body 3021 and a clamping flange 3022. One end of the hook body 3021 is connected to the second surface 3012, and the other end thereof is connected to the clamping flange 3022. The clamping flange 3022 extends from the first end 3015 of the clamping body 301 to the second end 3016 thereof, and a clamping portion 3023 is provided between the clamping flange and the hook body 3021. The clamping portion 3023 of the first clamping member 300 is opposite to the clamping portion 3023 of the second clamping member 310. When the first clamping member 300 and the second clamping member 310 move away from each other, the two clamping portions 3023 are respectively clamped into the clamping grooves 3013 of the quick-release part 2. When the first clamping member 300 and the second clamping member 310 move toward each other, the two clamping portions 3023 are respectively separated from the clamping grooves 3013 of the quick-release part 2, thereby separating the quick-assembly seat 6 from the quick-release part 2.

Figure 6:
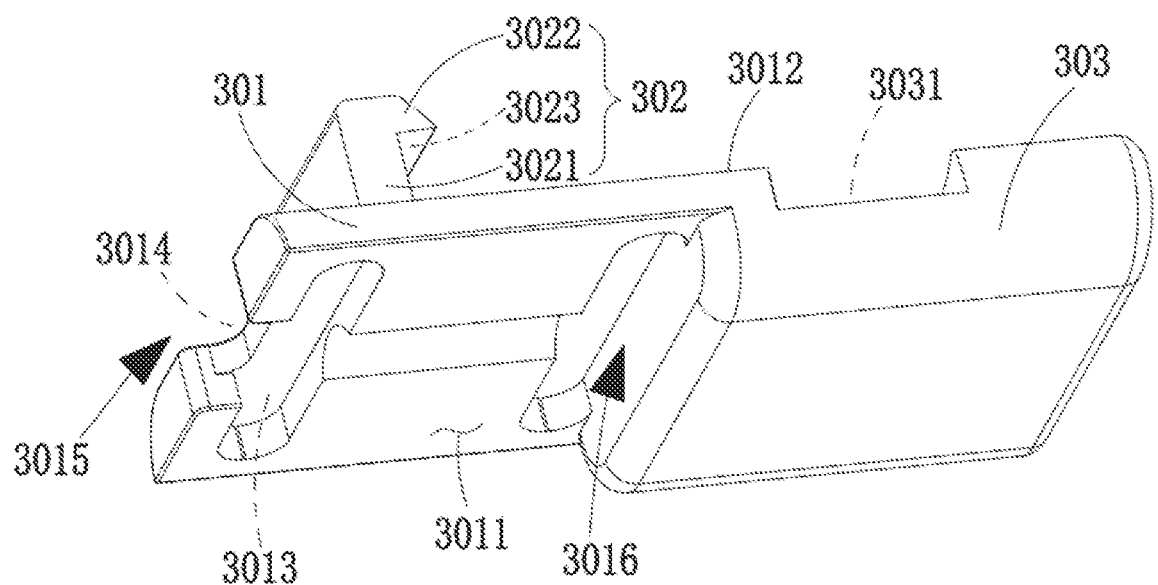
FIG. 6 is a structural view of a first clamping member according to the present invention.

As shown in FIGS. 6 and 7, the first surface 3011 of the clamping body 301 is provided with the clamping groove 3013. The clamping groove 3013 is close to the first end, and the first end is further provided with an avoidance notch 3014 penetrating through the first surface 3011 and the second surface 3012. The touch member 320 includes a touch body 3201 and the clamping piece 3202. The clamping piece 3202 is connected to an end of the touch body 3201 close to the mounting groove 111. When the clamping piece 3202 is clamped with the clamping groove 3013, the touch body 3201 is located in the avoidance notch 3014. The avoidance notch 3014 is configured to limit the touch body 3201 to make the clamping piece 3202 stably clamped into the clamping groove 3013.

The complete structure of the first clamping member 300 is described above. The second clamping member 310 has an identical structure as the first clamping member 300, and the structure of the second clamping member 310 will not be repeated here.

As shown in FIGS. 3, 4 and 7, the driving assembly 40 includes a first driving member, a second driving member and a third driving member. The first driving member, the second driving member and the third driving member are respectively used to drive the first clamping member 300, the second clamping member 310 and the touch member 320 to move. The three driving members can drive the first clamping member 300, the second clamping member 310 and the touch-control member 320 respectively by various means such as an elastic force or a magnetic force. In an embodiment, the three driving members drive the first clamping member 300, the second clamping member 310 and the touch member 320 to move by an elastic force. That is, the first driving member is a first elastic member 400, the second driving member is a second elastic member 410, and the third driving member is a third elastic member 420. The first elastic member 400 and the second elastic member 410 are arranged in the first sliding groove 100. Two ends of the first elastic member 400 are respectively connected to the limit seat 110 and the press seat 303 of the first clamping member 300. Two ends of the second elastic member 410 are respectively connected to the limit seat 110 and the press seat 303 of the second clamping member 310. An end of the touch body 3201 facing the limit seat 110 is provided with an accommodating cavity, and the third elastic member 420 is provided in the accommodating cavity. Two ends of the third elastic member 420 are respectively connected to a bottom surface of the mounting groove 111 and a bottom surface of the accommodating cavity.

Figure 8:
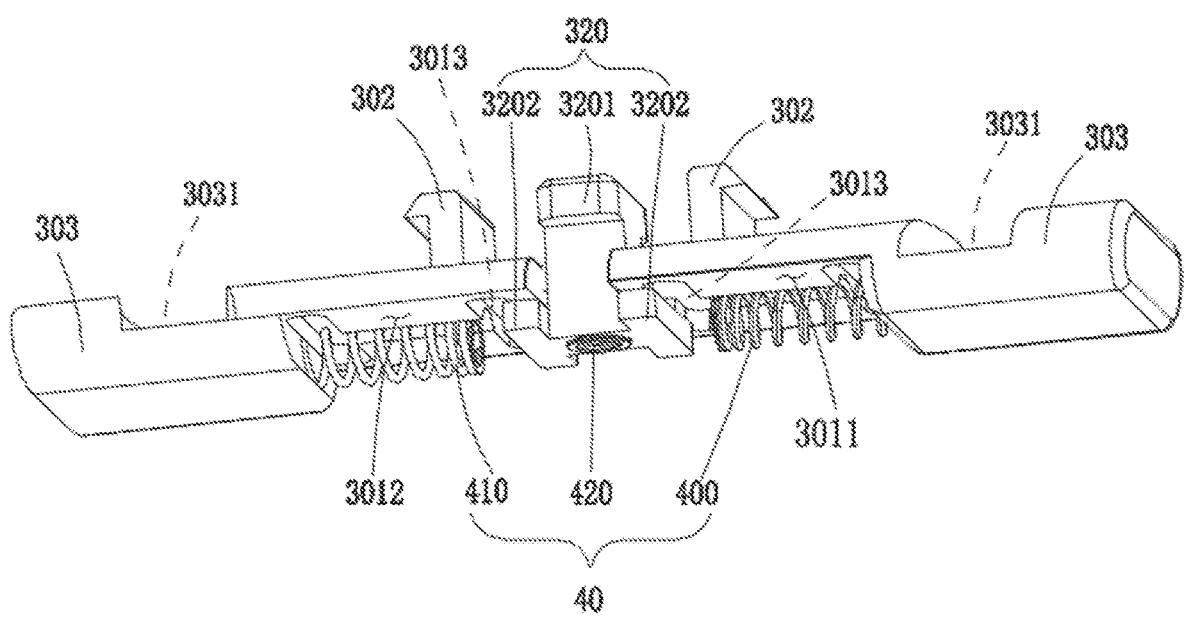
FIG. 8 is a structural view of the clamping assembly and the elastic assembly when the quick-assembly seat and the quick-release part are clamped according to the present invention.
Figure 9:
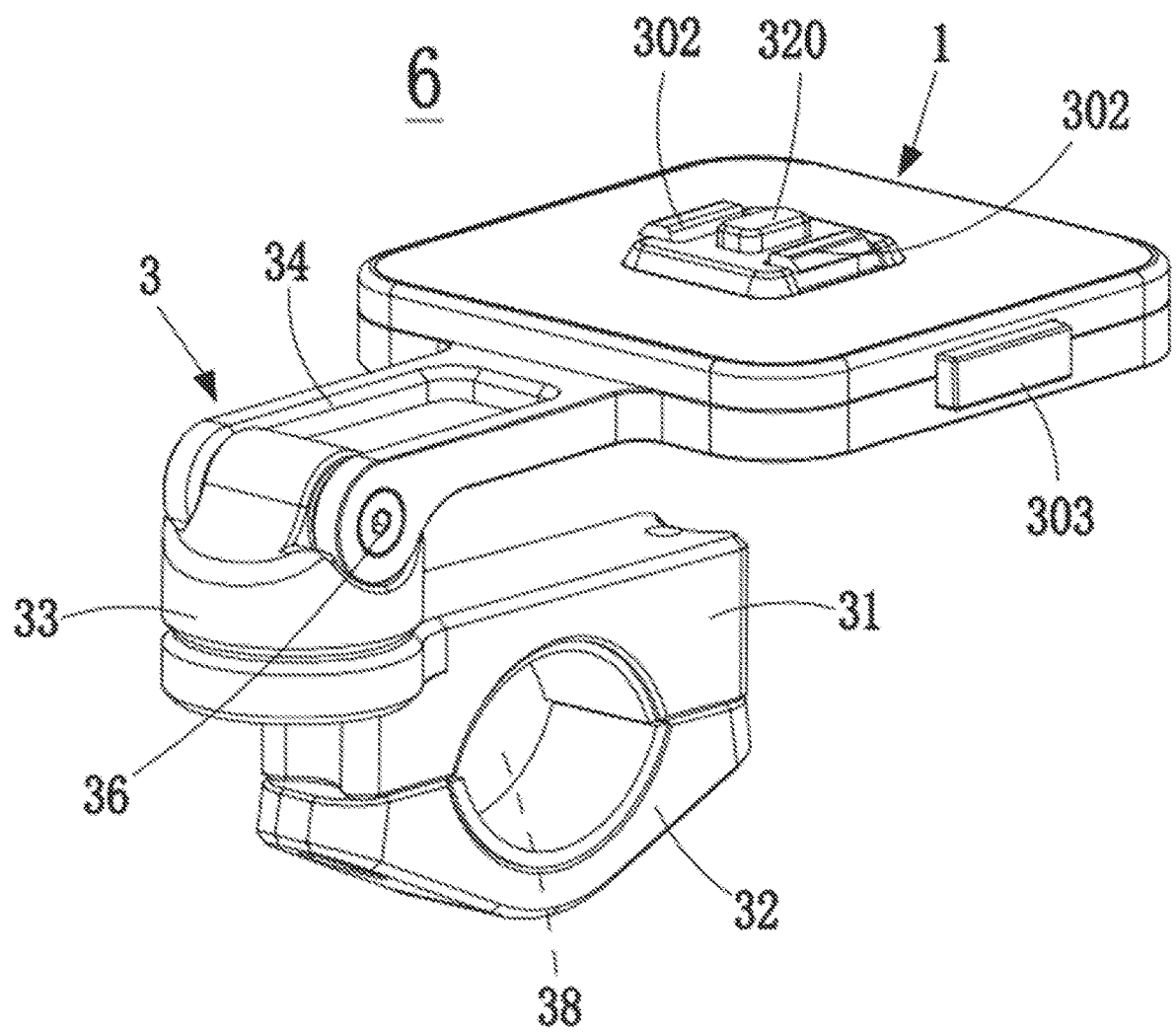
FIG. 9 is a structural view of the quick-assembly seat from an angle according to an embodiment of the present invention.
Figure 11:
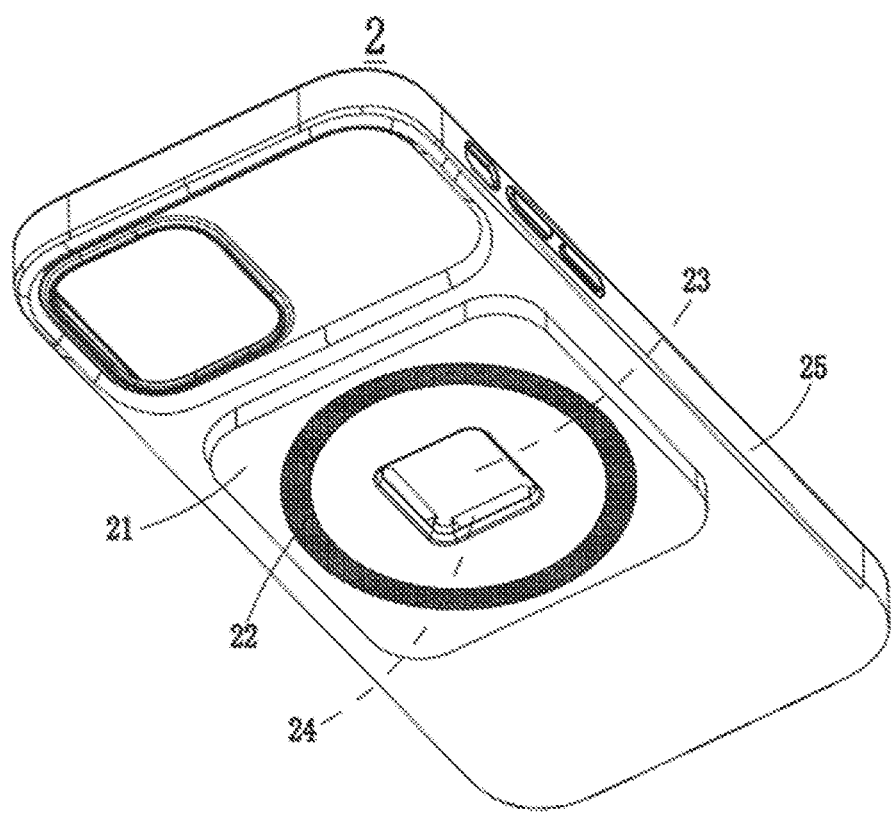
FIG. 11 is a structural view of the quick-release part according to an embodiment of the present invention.

As shown in FIGS. 8, 9 and 11, the quick-assembly seat 6 has a clamped state and an unclamped state. In the clamped state, the quick-assembly seat 6 and the quick-release part 2 are clamped together. The hook 302 of the first clamping member 300 and the hook 302 of the second clamping member 310 are far away from each other. The clamping grooves 3013 of the first clamping member 300 and the second clamping member 310 are separated from the two clamping pieces 3202 of the touch member 320 respectively. The third elastic member 420 elastically presses the touch body 3201 to drive the two clamping pieces 3202 to respectively abut against the first surface 3011 of the first clamping member 300 and the first surface 3011 of the second clamping member 310.

As shown in FIGS. 4, 7, 9, and 11, in the unclamped state, the quick-assembly seat 6 is separated from the quick-release part 2. The hook 302 of the first clamping member 300 and the hook 302 of the second clamping member 310 approach each other. The clamping grooves 3013 of the first clamping member 300 and the second clamping member 310 are respectively clamped with the two clamping pieces 3202 of the touch member 320. The first elastic member 400 and the second elastic member 410 accumulate an elastic force. Two ends of the first elastic member 400 press against the limit seat 110 and the press seat 303 of the first clamping member 300 respectively. Two ends of the second elastic member 410 press against the limit seat 110 and the press seat 303 of the second clamping member 310 respectively.

As shown in FIGS. 4, 6, 7, 9 and 11, when the quick-release part 2 needs to be connected, the press seat 303 of the first clamping member 300 and the press seat 303 of the second clamping member 310 are oppositely squeezed to drive the first clamping member 300 and the second clamping member 310 to move toward each other. The clamping groove 3013 of the first clamping member 300 and the clamping groove 3013 of the second clamping member 310 are respectively clamped with the two clamping pieces 3202 of the touch member 320. The first elastic member 400 and the second elastic member 410 accumulate an elastic force. The quick-release part 2 moves along the second direction, and the quick-release part 2 may move toward or away from the first sliding groove 100. When the quick-release part 2 moves toward the first sliding groove 100, positions of the first clamping member 300 and the second clamping member 310 to be clamped with the touch member 320 face the first sliding groove 100. The third elastic member 420 is compressed to accumulate an elastic force. When the quick-release part 2 moves away from the first sliding groove 100, the positions of the first clamping member 300 and the second clamping member 310 to be clamped with the touch member 320 face away from the first sliding groove 100. The third elastic member 420 is stretched to accumulate an elastic force. In an embodiment, the quick-release part 2 moves toward the first sliding groove 100. That is, the quick-release part 2 presses against the touch member 320 toward the first sliding groove 100, and drives the touch member 320 to move close to the first sliding groove 100 in the second direction until the clamping groove 3013 of the first clamping member 300 and the clamping groove 3013 of the second clamping member 310 are separated from the two clamping pieces 3202 of the touch member 320 respectively. The first elastic member 400 and the second elastic member 410 release the elastic force to drive the first clamping member 300 and the second clamping member 310 to move away from each other. The hook 302 of the first clamping member 300 and the hook 302 of the second clamping member 310 are respectively clamped into clamping slots 24 of the quick-release part 2. The third elastic member 420 is compressed to accumulate an elastic force.

Figure 5:
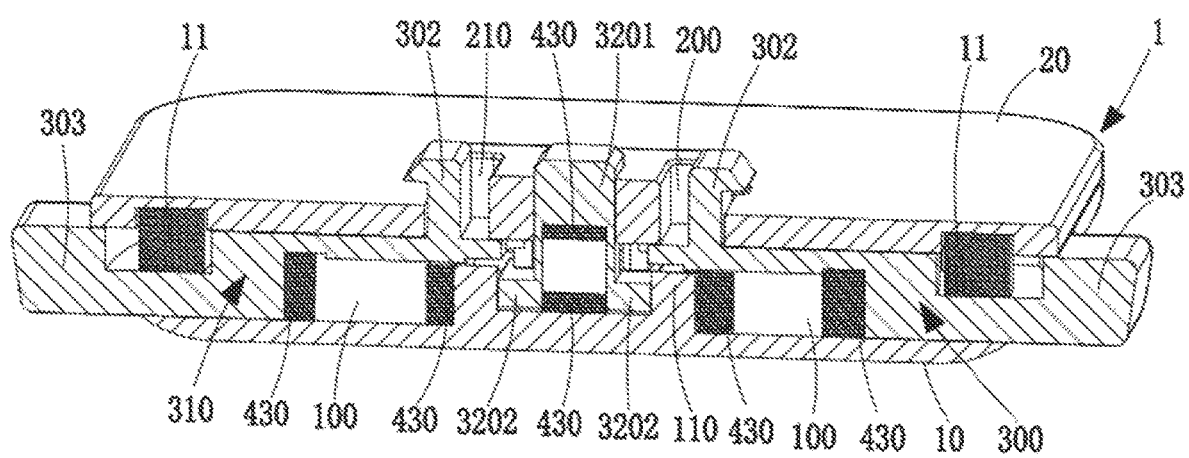
FIG. 5 is a full sectional view of the quick-assembly seat when the first connection structure is not shown according to another embodiment of the present invention.

As shown in FIGS. 4 and 5, in another embodiment, the driving assembly 40 may also drive the first clamping member 300, the second clamping member 310 and the touch member 320 to move by a magnetic force. In other words, the first elastic member 400, the second elastic member 410, and the third elastic member 420 in the above embodiment are each replaced with two magnets 430. That is, there are three sets of magnets 430, with two magnets 430 in each set. The two magnets 430 of the first set are respectively provided on the limit seat 110 and a side of the press seat 303 of the first clamping member 300 facing the limit seat 110. The two magnets 430 of the second set are respectively provided on the limit seat 110 and a side of the press seat 303 of the second clamping member 310 facing the limit seat 110. The two magnets 430 of the third set are respectively provided at a bottom of the mounting groove and a bottom of the accommodating cavity of the touch member 320. The two magnets 430 of each set maintain a repulsive state. When the first clamping member 300, the second clamping member 310 and the touch member 320 move, the corresponding two magnets 430 accumulate and release a magnetic force, so as to achieve the same effect as the corresponding elastic member accumulating and releasing an elastic force.

When the quick-release part 2 needs to be disassembled, the press seat 303 of the first clamping member 300 and the press seat 303 of the second clamping member 310 are oppositely squeezed to drive the first clamping member 300 and the second clamping member 310 to move toward each other. The clamping groove 3013 of the first clamping member 300 and the clamping groove 3013 of the second clamping member 310 are respectively clamped with the two clamping pieces 3202 of the touch member 320. The hook 302 of the first clamping member 300 and the hook 302 of the second clamping member 310 are respectively separated from the clamping slots 24 of the quick-release part 2 such that the quick-release part 2 is unclamped.

In another embodiment, the quick-release part 2 may be mounted without pressing the touch member 320. That is, the quick-release part 2 may directly be moved relative to the quick-assembly seat 6 to be clamped. The first clamping member 300 and the second clamping member 310 need to move for a distance of L1 from the state of being clamped with the quick-release part 2 to the state of being clamped with the touch member 320. When the quick-release part 2 is not mounted, the touch member 320 may also be pressed to drive the first clamping member 300 and the second clamping member 310 of the quick-assembly seat 6 to move away from each other to achieve a clamped state. At this time, the quick-release part 2 is not mounted on the quick-assembly seat 6. Then, the quick-release part 2 can also be mounted without pressing to drive the first clamping member 300 and the second clamping member 310 to move toward each other to be clamped with the touch member 320. Specifically, the quick-release part 2 is directly moved close to the quick-assembly seat 6 along the second direction. The clamping slots 24 of the quick-release part 2 respectively press against the clamping flanges 3022 of the two hooks 302 to drive the first clamping member 300 and the second clamping member 310 to move toward each other. After the two clamping members 2 move for a distance of L2, the clamping slots 24 of the quick-release part 2 correspond to the positions of the two clamping flanges 3022 respectively. The first clamping member 300 and the second clamping member 310 move away from each other under the action of the corresponding elastic members until they are respectively clamped into the clamping slots 24 of the quick-release part 2. L2 is less than L1, such that when the clamping slots 24 of the quick-release part 2 respectively correspond to the positions of the two clamping flanges 3022, the first clamping member 300 and the second clamping member 310 are not yet clamped with the touch member 320. Thus, the first clamping member 300 and the second clamping member 310 can move away from each other to be respectively clamped into the clamping slots 24 of the quick-release part 2.

In another embodiment, the touch member 320 of this embodiment may have a longer length. When the quick-release part 2 moves close to the quick-assembly seat 6, the quick-release part 2 first presses the touch member 320, such that the touch member 320 compresses the third elastic member 420. The two clamping pieces 3202 of the touch member 320 are respectively separated from the clamping groove 3013 of the first clamping member 300 and the clamping groove 3013 of the second clamping member 310. The hook 302 of the first clamping member 300 and the hook 302 of the second clamping member 310 move away from each other. At this time, the quick-release part 2 is not yet clamped with the two hooks 302. The quick-release part 2 continues to compress the third elastic member 420, and edges of the clamping slots 24 of the quick-release part 2 respectively press against the clamping flanges 3022 of the two hooks 302. In this way, the first clamping member 300 and the second clamping member 310 move toward each other. When the clamping slots 24 of the quick-release part 2 correspond to the positions of the two clamping flanges 3022, the first clamping member 300 and the second clamping member 310 move away from each other under the action of the corresponding elastic members until they are respectively clamped into the clamping slots 24 of the quick-release part 2. Compared with the above embodiment, in this embodiment, the touch member 320 is triggered before the quick-release part 2 is clamped with the two hooks 302, which facilitates the mounting of the quick-release part 2.

Figure 12:
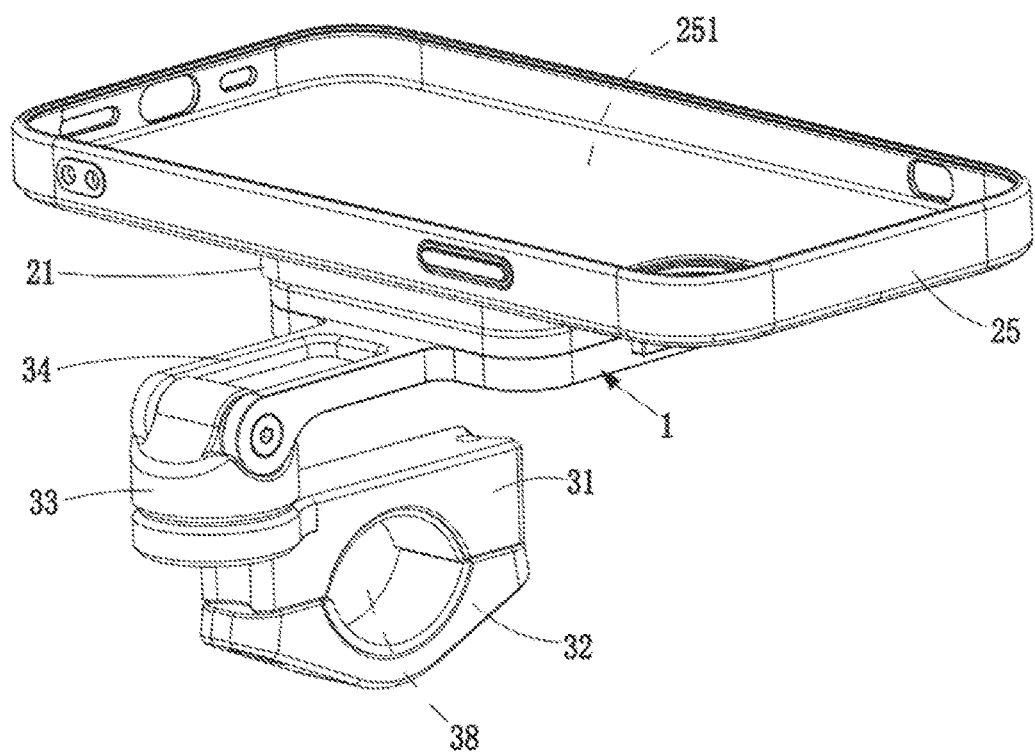
FIG. 12 is a structural view of the quick-release assembly according to an embodiment of the present invention.

As shown in FIGS. 9, 11 and 12, the present invention further provides a quick-release assembly, including the quick-release part 2 and the quick-assembly seat 6. The quick-release part 2 includes a quick-release body 21. A side of the quick-release body 21 facing the quick-assembly seat 6 is provided with the clamping slots 24. The clamping slots 24 are respectively clamped with or separated from the hook 302 of the first clamping member 300 and the hook 302 of the second clamping member 310. Specifically, a side of the quick-release body 21 facing the quick-assembly seat 6 is provided with a mounting cavity 23. A side wall of the mounting cavity 23 is provided with the clamping slots 24 along a circumferential direction, such that the quick-release part 2 can be clamped with the quick-assembly seat 6 in all directions, which is convenient for use.

As shown in FIGS. 4, 9 and 11, the quick-release body 21 may be made of a magnetic material, such as metal, which is convenient for magnetic connection with the first magnetic member 11 in the seat body 1, and is convenient for assembly with the quick-assembly seat 6. Alternatively, the quick-release body 21 may be made of a non-magnetic material, such as plastic. In addition, a second magnetic member 22 is provided on the side of the quick-release body 21 facing the quick-assembly seat 6. When the quick-release body 21 is close to the quick-assembly seat 6, the first magnetic member 11 and the second magnetic member 22 approach each other due to magnetic attraction. Thus, the quick-release body 21 presses against the touch body 3201 to move toward the third elastic member 420 in the second direction. When it moves to a certain extent, the two clamping pieces 3202 of the touch member 320 are separated from the clamping groove 3013 of the first clamping member 300 and the clamping groove 3013 of the second clamping member 310 respectively. The first elastic member 400 and the second elastic member 410 respectively release elastic forces to drive the first clamping member 300 and the second clamping member 310 to move away from each other. The hook 302 of the first clamping member 300 and the hook 302 of the second clamping member 310 move away from each other to be clamped into the clamping slots 24 of the quick-release body 21 respectively. In this way, the quick-release part 2 and the quick-assembly seat 6 can be quickly assembled, and after assembly, the quick-release part 2 and the quick-assembly seat 6 are not easily separated, achieving stable connection.

Figure 13:
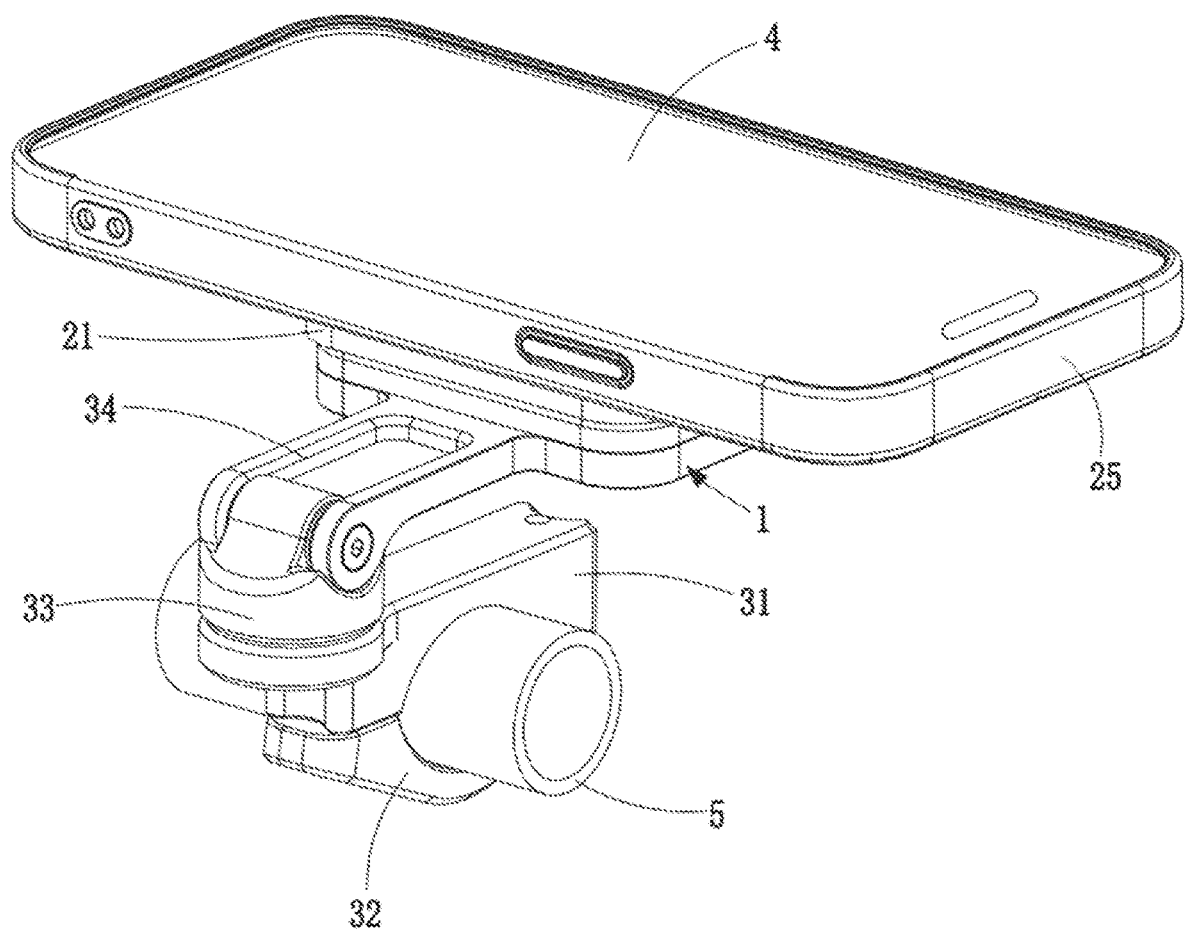
FIG. 13 is a structural view of a photographing apparatus according to an embodiment of the present invention.

As shown in FIGS. 9, 11 and 13, the quick-assembly seat 6 further includes a first connection structure connected to the base 10, and the quick-release part 2 further includes a second connection structure connected to the quick-release body 21. The second connection structure is provided on a side of the quick-release body 21 facing away from the quick-assembly seat 6. The second connection structure is used to connect a mobile phone 4, and the first connection structure is used to connect a bicycle, such that the mobile phone 4 is connected to the bicycle through the quick-release assembly.

As shown in FIGS. 11 and 12, in an embodiment, the second connection structure is a mobile phone case 25. The mobile phone case 25 may be bonded to the side of the quick-release part 2 facing away from the quick-assembly seat 6 by super glue. A side of the mobile phone case 25 facing away from the quick-release part 2 is provided with an limiting groove 251. The mobile phone case 25 is adapted to the model of the mobile phone 4 such that the mobile phone 4 can be stably mounted in the limiting groove 251 of the mobile phone case 25.

Figure 10:
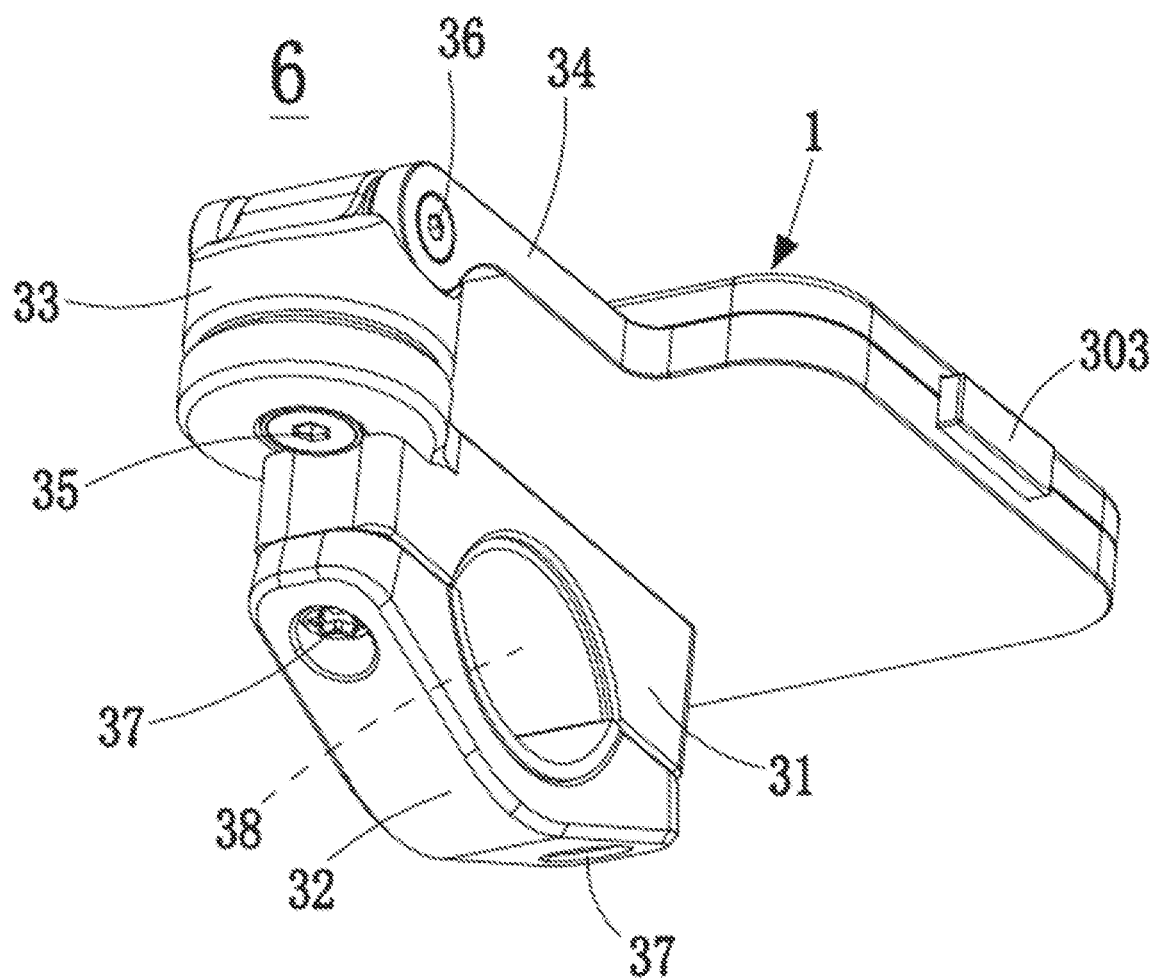
FIG. 10 is a structural view of the quick-assembly seat from another angle according to an embodiment of the present invention.

As shown in FIGS. 9, 10 and 13, in this embodiment, the first connection structure may be a rotating assembly 3. The rotating assembly 3 includes a first gripping member 31, a second gripping member 32, a rotating seat 33 and a supporting member 34. One end of the supporting member 34 is connected to the quick-assembly seat 6. The supporting member 34 and the quick-assembly seat 6 may be detachably connected, or may be fixedly connected by welding or integral molding. In this embodiment, the supporting member 34 and the quick-assembly seat 6 are integrally molded. The other end of the supporting member 34 is rotatably connected to the rotating seat 33 by a first tightening screw 35. The first tightening screw 35 can adjust the tightness between the supporting member 34 and the rotating seat 33, thereby adjusting the relative position of the supporting member 34 and the rotating seat 33. In this way, the supporting member 34 is configured to rotate relative to the rotating seat 33 in a third direction to adjust the position of the mobile phone 4. An end of the rotating seat 33 away from the supporting member 34 is rotatably connected to the first gripping member 31 by a second tightening screw 36. The second tightening screw 36 can adjust the tightness between the rotating seat 33 and the first gripping member 31, thereby adjusting the relative positions of the rotating seat 33 and the first gripping member 31. In this way, the rotating seat 33 is configured to rotate relative to the first gripping member 31 in a fourth direction to adjust the position of the mobile phone 4. The third direction may be perpendicular to the fourth direction. Limit slots 38 are respectively provided at opposite parts of the first gripping member 31 and the second gripping member 32. Two sides of the second gripping member 32 are respectively provided with connecting holes, and two corresponding sides of the first gripping member 31 are respectively provided with threaded mounting holes. During mounting, the limit slots 38 defined by the first gripping member 31 and the second gripping member 32 are buckled on the joystick 5 of the bicycle. Two connecting screws 37 respectively pass through the connecting holes of the second gripping member 32 and are respectively threadedly connected to the threaded mounting holes of the first gripping member 31, such that the rotating assembly 3 together with the mobile phone 4 is detachably mounted on the bicycle.

As shown in FIGS. 10 and 13, a rider can adjust and fix the mobile phone 4 at a suitable position when using the mobile phone 4 to take pictures of riding scenery along the way. First, a screwdriver is used to loosen the tightening screw 35 and the second tightening screw 36. Then the supporting member 34 and the rotating seat 33 are rotated until the quick-assembly seat 6 and the mobile phone 4 are rotated together to a target position. Finally, the screwdriver is used to tighten the first tightening screw 35 and the second tightening screw 36.

As shown in FIGS. 9, 11 and 13, the present invention further provides a photographing apparatus, including a photographing device and the above quick-release assembly. The quick-release assembly includes the quick-assembly seat 6 and the quick-release part 2. The photographing device is connected to the side of the quick-release part 2 facing away from the quick-assembly seat 6, and the quick-assembly seat 6 is connected to a mounting position, such that the photographing device is mounted at the mounting position. The photographing device may be the mobile phone 4, and the mounting position may be the joystick 5 of the bicycle. The mobile phone 4 may be connected to the quick-release part 2 and the quick-assembly seat 6 may be connected to the joystick 5 of the bicycle, such that the mobile phone 4 is mounted on the joystick 5 of the bicycle. The mobile phone 4 and the quick-release part 2 may be connected through the second connection structure. The quick-assembly seat 6 may be connected to the joystick 5 of the bicycle through the first connection structure. The first connection structure and the second connection structure are described in the above embodiment, and will not be repeated here.

The technical characteristics of the above embodiments may be employed in arbitrary combinations. In an effort to provide a concise description of these embodiments, all possible combinations of all technical characteristics of the embodiments may not be described. However, these combinations of technical characteristics should be construed as disclosed in the description in case no contradiction occurs.

The above embodiments are intended to illustrate several implementations of the present invention in detail, and they should not be construed as a limitation to the patentable scope of the present invention. It should be pointed out that those of ordinary skill in the art may further make several modifications, substitutions and improvements without departing from the concept of the present invention, which should be covered by the scope of protection of the present invention. Therefore, the protection scope of the present invention should be subject to the claims.

What is claimed is:

1. A quick-assembly seat, for connecting a quick-release part, and comprising:
    a seat body;
    a clamping assembly, comprising a clamping member and a touch member, wherein the clamping member is slidably connected to the seat body along a first direction, and the touch member is slidably connected to the seat body along a second direction; and the first direction and the second direction are perpendicular to each other; and
    a driving assembly, comprising a first driving member provided along the first direction and a third driving member provided along the second direction, wherein the first driving member is provided between the seat body and the clamping member, and the third driving member is provided between the seat body and the touch member;
    wherein the clamping member is configured to move along the first direction from an outside of the seat body to an inside of the seat body, wherein the third driving member is allowed to release a first driving force to drive the touch member to be clamped with the clamping member, and the first driving member is allowed to accumulate a second driving force;
    the touch member is configured to move along the second direction to allow the third driving member to accumulate the first driving force;
    when the clamping member is separated from the touch member, the first driving member releases the second driving force to drive the clamping member to move along the first direction from the inside of the seat body to the outside of the seat body so as to clamp the quick-release part;
    one of the clamping member and the touch member is provided with a clamping groove, and the other one of the clamping member and the touch member comprises a clamping piece;
    the clamping piece is clamped with or separated from the clamping groove;
    the clamping member comprises a first surface and a second surface opposite to each other;
    the first surface is provided with the clamping groove;
    the touch member comprises a touch body and the clamping piece connected to the touch body;
    when the clamping piece is separated from the clamping groove, the third driving member pushes the touch body to drive the clamping piece to abut against the first surface;
    an end of the clamping member is provided with an avoidance notch, wherein the avoidance notch penetrates the first surface and the second surface, and the avoidance notch communicates with the clamping groove; and
    when the clamping piece is clamped into the clamping groove, the touch body is located in the avoidance notch.

2. The quick-assembly seat according to claim 1, wherein the clamping member comprises a first clamping member and a second clamping member, wherein the first clamping member and the second clamping member are arranged oppositely and have an identical structure;
    the first clamping member and the second clamping member are slidably connected to the seat body along the first direction, and the first clamping member and the second clamping member respectively comprise two hooks;
    the two hooks respectively comprise two clamping flanges, wherein the two clamping flanges extend in opposite directions; and
    when the clamping groove is separated from the clamping piece, the two clamping flanges are clamped with the quick-release part.

3. A quick-release assembly, comprising:
    a quick-release part, and
    the quick-assembly seat according to claim 1;
    wherein a first side of the quick-release part is provided with a clamping slot, wherein the first side of the quick-release part faces the quick-assembly seat; and
    the clamping member is clamped into the clamping slot.

4. The quick-release assembly according to claim 3, wherein
the first side of the quick-release part is provided with a mounting cavity, and the clamping slot is provided on a side wall of the mounting cavity; and
when the clamping member is clamped into the clamping slot, the clamping member and the touch member are at least partially located in the mounting cavity.

5. The quick-release assembly according to claim 3, wherein
the seat body is provided with a first magnetic member, and the quick-release part is provided with a second magnetic member;
when the quick-release part approaches the quick-assembly seat, the first magnetic member and the second magnetic member approach each other by magnetic attraction, wherein the quick-release part presses against the touch member along the second direction, and the third driving member accumulates the first driving force; and
when the clamping member is separated from the touch member, the first driving member releases the second driving force to drive the clamping member to move along the first direction from the inside of the seat body to the outside of the seat body so as to be clamped into the clamping slot of the quick-release part.

6. The quick-release assembly according to claim 3, further comprising:
a first connection structure provided on the quick-assembly seat, and
a second connection structure provided on the quick-release part;
wherein the first connection structure is connected to a mounting position, and the second connection structure is connected to a photographing device.

7. The quick-release assembly according to claim 6, wherein
the second connection structure is a mobile phone case, and the mobile phone case is adhered to a second side of the quick-release part, wherein the second side of the quick-release part faces away from the quick-assembly seat;
a side of the mobile phone case is provided with a limiting groove, wherein the side of the mobile phone case faces away from the quick-release part; and
the limiting groove is used to mount a mobile phone.

8. The quick-release assembly according to claim 6, wherein
the first connection structure comprises a first gripping member, a second gripping member, a rotating seat and a supporting member;
a first end of the supporting member is connected to the quick-assembly seat, and a second end of the supporting member is rotatably connected to the rotating seat;
the supporting member is configured to rotate relative to the rotating seat along a third direction to adjust a position of the second connection structure;
the rotating seat is further connected to a first side of the first gripping member, and a second side of the first gripping member is connected to the second gripping member;
limit slots configured to be opened or closed are respectively provided at opposite parts of the first gripping member and the second gripping member; and
the limit slots are used to connect the mounting position.

9. The quick-release assembly according to claim 8, wherein
the rotating seat is rotatably connected to the first gripping member, and the rotating seat is configured to rotate relative to the first gripping member along a fourth direction to adjust the position of the second connection structure; and
the fourth direction and the third direction are perpendicular to each other.

10. A photographing apparatus, comprising:
a photographing device, and
the quick-release assembly according to claim 3; wherein
the photographing device is connected to a side of the quick-release part, wherein the side of the quick-release part faces away from the quick-assembly seat.

11. The photographing apparatus according to claim 10, wherein
the photographing device is a mobile phone.

12. A quick-assembly seat, for connecting a quick-release part, and comprising:
a seat body;
a clamping assembly, comprising a clamping member and a touch member, wherein the clamping member is slidably connected to the seat body along a first direction, and the touch member is slidably connected to the seat body along a second direction; and the first direction and the second direction are perpendicular to each other; and
a driving assembly, comprising a first driving member provided along the first direction and a third driving member provided along the second direction, wherein the first driving member is provided between the seat body and the clamping member, and the third driving member is provided between the seat body and the touch member;
wherein the clamping member is configured to move along the first direction from an outside of the seat body to an inside of the seat body, wherein the third driving member is allowed to release a first driving force to drive the touch member to be clamped with the clamping member, and the first driving member is allowed to accumulate a second driving force;
the touch member is configured to move along the second direction to allow the third driving member to accumulate the first driving force;
when the clamping member is separated from the touch member, the first driving member releases the second driving force to drive the clamping member to move along the first direction from the inside of the seat body to the outside of the seat body so as to clamp the quick-release part;
one of the clamping member and the touch member is provided with a clamping groove, and the other one of the clamping member and the touch member comprises a clamping piece;
the clamping piece is clamped with or separated from the clamping groove;
the clamping member comprises a first surface and a second surface opposite to each other;
the first surface is provided with the clamping groove;
the touch member comprises a touch body and the clamping piece connected to the touch body;
when the clamping piece is separated from the clamping groove, the third driving member pushes the touch body to drive the clamping piece to abut against the first surface;
the clamping member comprises a first clamping member and a second clamping member, the first clamping member and the second clamping member are arranged oppositely and have an identical structure;

the first clamping member and the second clamping member are slidably connected to the seat body along the first direction, and the first clamping member and the second clamping member respectively comprise two hooks;

the two hooks respectively comprise two clamping flanges, wherein the two clamping flanges extend in opposite directions;

when the clamping groove is separated from the clamping piece, the two clamping flanges are clamped with the quick-release part;

a first sliding groove extending along the first direction and a second sliding groove extending along the second direction are provided in the seat body;

the driving assembly further comprises a second driving member;

the first driving member, the second driving member, the first clamping member and the second clamping member are respectively provided in the first sliding groove;

the first driving member is provided between the first clamping member and the seat body, the second driving member is provided between the second clamping member and the seat body, and the third driving member is provided between the touch member and the seat body;

the touch member and the third driving member are arranged in the second sliding groove; and the touch member, the first clamping member and the second clamping member penetrate the seat body and protrude out of the seat body.

13. The quick-assembly seat according to claim 12, wherein
the first driving member, the second driving member and the third driving member are elastic members;
the first clamping member and the second clamping member are configured to move toward each other;
the third driving member is configured to release a first elastic force to drive the touch member to be simultaneously clamped with the first clamping member and the second clamping member, while the first driving member and the second driving member accumulate a second elastic force;
the touch member is configured to move toward the third driving member, wherein the third driving member is allowed to accumulate the first elastic force; and
when the first clamping member and the second clamping member are separated from the touch member, the first driving member and the second driving member release the second elastic force, wherein the first clamping member and the second clamping member are driven to move away from each other along the first direction to clamp the quick-release part.

14. The quick-assembly seat according to claim 12, wherein
the first driving member, the second driving member and the third driving member are magnetic members;
the first clamping member and the second clamping member are configured to move toward each other;
the third driving member is configured to release a first magnetic force to drive the touch member to be simultaneously clamped with the first clamping member and the second clamping member, while the first driving member and the second driving member accumulate a second magnetic force;
the touch member is configured to move toward the third driving member, wherein the third driving member is allowed to accumulate the first magnetic force; and
when the first clamping member and the second clamping member are separated from the touch member, the first driving member and the second driving member release the second magnetic force, wherein the first clamping member and the second clamping member are driven to move away from each other along the first direction to clamp the quick-release part.

15. A quick-assembly seat, for connecting a quick-release part, and comprising:
a seat body;
a clamping assembly, comprising a clamping member and a touch member, wherein the clamping member is slidably connected to the seat body along a first direction, and the touch member is slidably connected to the seat body along a second direction; and the first direction and the second direction are perpendicular to each other; and
a driving assembly, comprising a first driving member provided along the first direction and a third driving member provided along the second direction, wherein the first driving member is provided between the seat body and the clamping member, and the third driving member is provided between the seat body and the touch member;
wherein the clamping member is configured to move along the first direction from an outside of the seat body to an inside of the seat body, wherein the third driving member is allowed to release a first driving force to drive the touch member to be clamped with the clamping member, and the first driving member is allowed to accumulate a second driving force;
the touch member is configured to move along the second direction to allow the third driving member to accumulate the first driving force;
when the clamping member is separated from the touch member, the first driving member releases the second driving force to drive the clamping member to move along the first direction from the inside of the seat body to the outside of the seat body so as to clamp the quick-release part;
the clamping member moves for a distance of L1 to change from a position to clamp the quick-release part to a position to clamp the touch member; and
alternatively, the quick-release part directly presses against the clamping member along the second direction without touching the touch member, and drives the clamping member to move for a distance of L2 along the first direction from the outside of the seat body to the inside of the seat body, so as to be clamped with the clamping member, wherein L2 is less than L1.

16. A quick-release assembly, comprising:
a quick-release part, and
a quick-assembly seat for connecting a quick-release part;
wherein the quick-assembly seat comprises:
a seat body;
a clamping assembly, comprising a clamping member and a touch member, wherein the clamping member is slidably connected to the seat body along a first direction, and the touch member is slidably connected to the seat body along a second direction; and the first direction and the second direction are perpendicular to each other; and
a driving assembly, comprising a first driving member provided along the first direction and a third driving member provided along the second direction, wherein the first driving member is provided between the seat body and the clamping member, and the third driving member is provided between the seat body and the touch member;

wherein the clamping member is configured to move along the first direction from an outside of the seat body to an inside of the seat body, wherein the third driving member is allowed to release a first driving force to drive the touch member to be clamped with the clamping member, and the first driving member is allowed to accumulate a second driving force;

the touch member is configured to move along the second direction to allow the third driving member to accumulate the first driving force; and when the clamping member is separated from the touch member, the first driving member releases the second driving force to drive the clamping member to move along the first direction from the inside of the seat body to the outside of the seat body so as to clamp the quick-release part;

wherein a first side of the quick-release part is provided with a clamping slot, wherein the first side of the quick-release part faces the quick-assembly seat;

the clamping member is clamped into the clamping slot;

the seat body is provided with a first magnetic member, and the quick-release part is provided with a second magnetic member;

when the quick-release part approaches the quick-assembly seat, the first magnetic member and the second magnetic member approach each other by magnetic attraction, wherein the quick-release part presses against the touch member along the second direction, and the third driving member accumulates the first driving force;

when the clamping member is separated from the touch member, the first driving member releases the second driving force to drive the clamping member to move along the first direction from the inside of the seat body to the outside of the seat body so as to be clamped into the clamping slot of the quick-release part; and the first magnetic member is ring-shaped and surrounds the clamping slot, and the second magnetic member is ring-shaped and surrounds the touch member.

17. The quick-release assembly according to claim 16, wherein the clamping member is provided with a ring-shaped accommodating groove;

a radial dimension of the ring-shaped accommodating groove is greater than a radial dimension of the first magnetic attraction member; and the first magnetic member is located in the ring-shaped accommodating groove, and the first magnetic member limits a movable distance of the clamping member relative to the first magnetic member.

* * * * *